United States Patent [19]

Hatori

[11] Patent Number: 4,929,043

[45] Date of Patent: May 29, 1990

[54] LIGHT BEAM DEFLECTOR

[75] Inventor: Masami Hatori, Kanagawa, Japan

[73] Assignee: Fuji Photo Film Co., Ltd., Kanagawa, Japan

[21] Appl. No.: 358,228

[22] Filed: May 30, 1989

[30] Foreign Application Priority Data

May 31, 1988 [JP] Japan .................................. 63-133738
May 31, 1988 [JP] Japan .................................. 63-133739

[51] Int. Cl.$^5$ ............................................. G02B 6/10
[52] U.S. Cl. ................................................. 350/96.13
[58] Field of Search ............... 350/96.13, 96.14, 96.15

[56] References Cited

U.S. PATENT DOCUMENTS

| | | | |
|---|---|---|---|
| 3,919,669 | 11/1975 | Hartemann | 350/96.13 |
| 4,425,023 | 1/1984 | Matsumoto et al. | 350/96.13 |
| 4,455,064 | 6/1984 | Kenan | 350/96.13 |
| 4,470,661 | 9/1984 | Matsumoto | 350/96.13 |
| 4,595,253 | 6/1986 | Yamashita et al. | 350/96.13 |
| 4,735,476 | 4/1988 | Heffner et al. | 350/96.13 |
| 4,815,802 | 3/1989 | Nakamura | 350/96.14 X |

FOREIGN PATENT DOCUMENTS

| | | | |
|---|---|---|---|
| 192232 | 10/1984 | Japan | 350/96.13 |
| 183626 | 2/1985 | Japan | 350/96.13 |
| 527973 | 1/1975 | U.S.S.R. | 350/96.14 |

OTHER PUBLICATIONS

IEE Transactions on Circuits and Systems, vol. CA-S-26, No. 12, C. S. Tsai, "Guided-Wave Acoustooptic Bragg Modulators for Wide-Band Integrated Optic Communications and Signal Processing", Dec. 1979, pp. 1072-1098.

Primary Examiner—Frank Gonzalez
Assistant Examiner—Phan T. Heartney
Attorney, Agent, or Firm—Sughrue, Mion, Zinn, Macpeak & Seas

[57] ABSTRACT

A light beam deflector employs first and second surface elastic waves to deflect a guided wave introduced as a light beam and guided in an optical waveguide. The surface elastic waves are generated respectively by first and second tilted-finger chirped interdigital transducers or curved-finger interdigital transducers which are arranged such that they deflect the guided wave successively and thereby achieve a total deflection angle range which is wide. The light beam deflector may also include third and fourth interdigital transducers for generating third and fourth surface elastic waves for deflecting another guided wave which is split from the light beam. The deflected two light beams emitted from the optical waveguide scan a surface along a common scanning line or along respective independent scanning lines. The light beam deflector further includes an electrooptic light modulator for modulating the guided wave or waves with an image signal at a high speed.

17 Claims, 10 Drawing Sheets

FIG.3(a)
FIG.3(b)
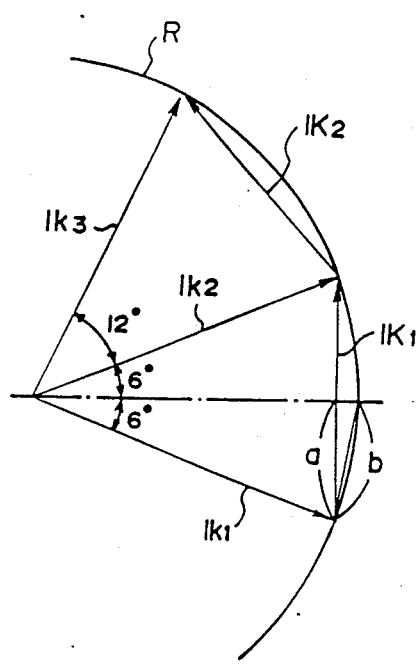
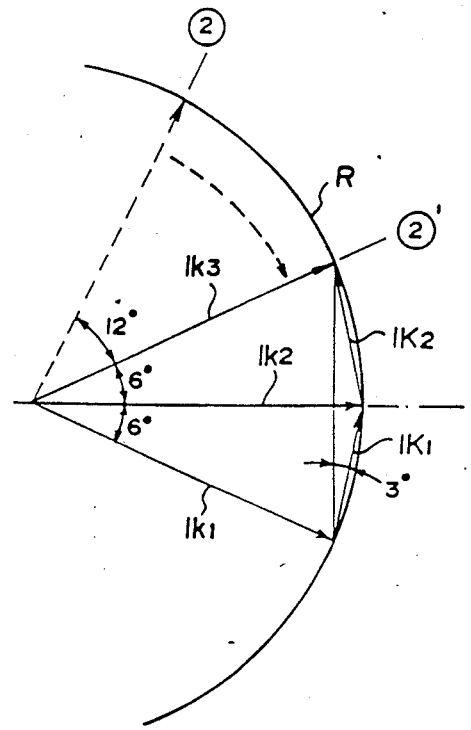

LIGHT BEAM DEFLECTOR

BACKGROUND OF THE INVENTION

1. Field of the Invention

The present invention relates to a light beam deflector for deflecting a guided light beam in an optical waveguide. A surface elastic wave is generated in the optical waveguide and diffracts the guided light beam. More particularly this invention relates to a light beam deflector in which a light beam is deflected twice with two surface elastic waves, which results in a wide angle of deflection, and in which two light beams are simultaneously deflected so that two images may be recorded or read, respectively, at the same time.

2. Description of the Prior Art

There is known a light beam deflector, as disclosed in Japanese Unexamined Patent Publication No. 61(1986)-183626, which comprises an optical waveguide made of a material capable of propagating a surface elastic wave therethrough. A light beam is applied to the optical waveguide and propagated therethrough as a guided wave. A surface elastic wave is produced in the optical waveguide and directed across the guided wave, and the guided wave is diffracted by the surface elastic wave through Bragg diffraction. In order continuously to vary the angle of diffraction (i.e. the angle of deflection) of the guided wave, the frequency of the surface elastic wave is continuously varied. A light beam deflector of this type is advantageous over a mechanical light beam deflector such as a galvanometer mirror or a polygon mirror, an electrooptic deflector (EOD), and an acoustooptic deflector AOD), since it may be small in size, light in weight, and highly reliable as it has no mechanical movable parts.

A light beam scanning recording apparatus which employs such a light beam deflector includes a light source such as a semiconductor laser for emitting a light beam as a recording light beam, a photosensitive medium positioned such that it can be irradiated with the light beam which is emitted from the optical waveguide of the light beam deflector, an auxiliary scanning means for moving the photosensitive medium in a direction substantially perpendicular to the direction in which the light beam is deflected by the light beam deflector, and a light beam modulator for modulating the light beam with an image signal (through intensity modulation or pulse modulation). In order to modulate the light beam, it has been customary to directly modulate a drive signal applied to the semiconductor laser which emits the light beam, which serves as the recording light beam, or to vary the intensity of the surface elastic wave generated in the light beam deflector, thereby varying the efficiency with which the guided wave is diffracted, i.e., the intensity of the deflected light beam. Generally, an interdigital transducer (IDT) and a driver for applying an alternating voltage having a continuously varying frequency to the IDT are employed as a means for continuously generating a surface elastic wave. Varying of the voltage applied to the IDT in turn varies the intensity of the surface elastic wave.

However, a light beam deflector of the type described above has a problem in that it cannot achieve a large angle of deflection. More specifically, since the light beam deflecting angle is substantially proportional to the frequency of the surface elastic wave, if a large angle of deflection is to be obtained, then the frequency of the surface elastic wave has necessarily to be increased to a very high value. Therefore, the frequency of the surface elastic wave would have to vary over a wide range. In addition, to meet the conditions for Bragg diffraction, the direction of travel of the surface elastic wave would have to be continuously steered to control the angle of incidence of the guided wave on the surface elastic wave.

To meet the above requirements, there has been proposed a light beam deflector, as also disclosed in Japanese Unexamined Patent Publication No. 61(1986)183626, which has a plurality of interdigital transducers (IDT) for generating respective surface elastic waves with frequencies which vary over different ranges. The IDTs are oriented such that they emit the surface elastic waves in different directions, and they are alternately switched into and out of operation.

This light beam deflector has a problem in that since the diffraction efficiency is lowered around the crossover frequency of the surface elastic waves generated by the IDTs, the intensity of the deflected light beam depends on the angle of deflection.

An IDT which deflects the light beam through a large angle must be arranged so as to be capable of producing a surface elastic wave of a very high frequency. This will be described below with reference to an example. If it is assumed that the angle of incidence of the guided wave on the surface elastic wave is $\theta$, then $\alpha$, the angle of deflection of the guided wave due to an acoustooptic interaction between the surface elastic wave and the guided wave, is $\alpha = 2\theta$, which is expressed as follows:

$$
\begin{aligned}
2\theta &= 2\sin^{-1}\{\lambda/(2Ne \cdot \Lambda)\} \\
&\approx \lambda/(Ne \cdot \Lambda) \\
&= \lambda \cdot f/(Ne \cdot v)
\end{aligned} \tag{1}
$$

where $\lambda$ is the wavelength of the guided wave, Ne is the effective refractive index of the optical waveguide with respect to the guided wave, and $\Lambda$, f, v are the wavelength, frequency, and speed, respectively, of the surface elastic wave. Therefore, the deflection angle range $\Delta(2\theta)$ becomes:

$$\Delta(2\theta) = \Delta f \cdot \lambda / Ne \cdot v$$

If a deflection angle range $\Delta(2\theta) = 10°$ is to be obtained with $\lambda = 0.78$ μm, Ne = 2.2, and v = 3500 m/s, for example, then the frequency range of the surface elastic wave, i.e., the range of high frequencies to be applied to the IDT must vary by $\Delta f = 1.72$ GHz. If this frequency range is selected to be 1 octave so a not to be affected by secondary diffracted light, then the central frequency is $f_0 = 2.57$ GHz, and the maximum frequency is $f_2 = 3.43$ GHz. The wavelength $\Lambda$ of the surface elastic wave which is produced by the IDT and has the maximum frequency $f_2$ becomes $\Lambda = 1.02$ μm, and the line width W of the electrode fingers of the IDT becomes $W = \Lambda/4 = 0.255$ μm.

With the conventional photolithographic and electron beam printing processes used for fabricating IDTs, the limits for the line widths at present are 0.8 μm and 0.5 μm, respectively. It is therefore impossible to fabricate an IDT having very small line widths as described above. Even if such a finely fabricated IDT could be produced in the future, it would be difficult and highly expensive to produce a driver for generating a frequency as high as 3.43 GHz, and it would be difficult to apply a high voltage to such an IDT. Moreover, if the frequency of the surface elastic wave is increased, as described above, the wavelength thereof is reduced, and hence the surface elastic wave is absorbed to a greater extent by the optical waveguide, resulting in a reduction in the diffraction efficiency.

IEEE Transactions on Circuits and Systems, vol. CAS-26, No. 12, p. 1072 [Guided-Wave Acoustooptic Bragg Modulators for Wide-Band Integrated Optic Communications and Signal Processing] by C. S. TSAI, does not disclose a light beam deflector in which a plurality of IDTs are switched into and out of operation, but does disclose a single IDT constructed as an IDT having arcuate electrode fingers, each having a continuously varying line width, which causes the frequency and the direction of travel of a surface elastic wave to vary continuously over a wide range. The disclosed arrangement eliminates the aforesaid problem of variation in the intensity of a light beam, which variation depends on the angle of deflection of the light beam, but still requires the surface elastic wave to have a high frequency.

There is a demand in the medical field, for example, for an apparatus which can record or reproduce two images, formed with different magnification ratios or under different image processing conditions, on a single medium for medical diagnosis. The light beam deflectors of the type described above may be employed to scan a photosensitive medium with a light beam both to record an image and also to record two images simultaneously thereon. The division of the light beam deflection angle range into two deflection angle ranges and modulation of the light beams in the respective deflection angle ranges with different image signals allows two images to be recorded on the photosensitive medium.

It is also possible to employ the above light beam deflectors in the construction of a light team scanning reading apparatus for simultaneously reading out two images. In such a light beam scanning reading apparatus, an original medium with two images recorded thereon is scanned by a light beam to cause it to emit or reflect light. Then, in order to produce an image signal the light emitted or reflected when the original medium was exposed is photoelectrically detected, the deflection angle is divided into two ranges, and thus two image signals are extracted representing the two images, respectively.

Inasmuch as it is difficult for light beam deflectors of the above kind to provide a large deflection angle range, however, any light beam deflection angle range available when the light beam deflector is used to record or read out two images therein is small because it is a division of an already inherently small deflection angle range. With such a small deflection angle range, only small-sized images can be recorded or read out.

If a drive signal to be applied to a semiconductor laser used as a light source for emitting a light beam is directly modulated for the purpose of recording a desired image, as described above, then the wavelength of the light beam tends to fluctuate, particularly it suffers from a jump owing to mode hopping, so that the efficiency with which it is diffracted by the surface elastic wave and the angle of diffraction of the guided wave may vary and make unstable the intensity of the recording light beam and the scanning position, which is the position at which the photosensitive medium is scanned by the recording light beam.

If the intensity of the surface elastic wave is varied to modulate the recording light beam, on the other hand, since at least a certain period of time is required for the surface elastic wave to traverse the guided wave in order to fully switch from one modulation state over to another modulation state, it is difficult to increase the frequency of modulation. This drawback will be described below in specific detail. If it is assumed that the beam width of the guided wave is represented by D and the speed of the surface elastic wave by v, the period of time $\tau$ needed for the surface elastic wave to traverse the guided wave is expressed as $\tau = D/v$. The beam width D is generally set to a large value so that a large number of resolution points are provided. If the beam width is $D = 1$ mm and the speed of the surface elastic wave is $v = 3500$ m/s, for example, then the period of time becomes $\tau = 0.286$ $\mu$s. Because the modulation frequency $f_M$ is $1/\tau$ at maximum, the modulation frequency $f_M$ in this example is 3.5 MHz, which is a considerably low value. With the modulation frequency being low, it is difficult to effect high-speed image recording.

SUMMARY OF THE INVENTION

It is an object of the present invention to provide a light beam deflector which can provide a wide deflection angle range with no variation in the intensity of a deflected light beam and also with no increase in the frequency of a surface elastic wave generated to deflect the light beam.

It is also an object of the present invention to provide a light beam deflector which can be employed to record or read out two images simultaneously and can provide a large light beam deflection angle range which is necessary for the recording or reading out of each of such two images.

Another object of the present invention is to provide a light beam deflector which allows a light beam to be modulated at an increased speed without causing the intensity of the light beam to vary and also without causing the scanning position to fluctuate.

According to the present invention, a first light beam deflector passes a guided wave through an optical waveguide made of a material capable of propagating surface elastic waves, and diffracts and deflects the guided wave with surface elastic waves, the optical waveguide exhibiting electrooptic effects.

The first light beam deflector further includes:
an electrooptic light modulator disposed in the path of a guided wave in the optical waveguide, which electrooptic light modulator varies an electric field applied to the optical waveguide, which in turn varies the efficiency with which the guided wave is diffracted, thereby modulating the guided wave;
first surface elastic wave generating means for generating in the optical waveguide a first surface elastic wave which travels across the path of the modulated guided wave traveling in the optical waveguide, and thereby diffracts and deflects the modulated guided wave;
second surface elastic wave generating means for generating in the optical waveguide a second surface elastic wave which travels across the path of the diffracted guided wave and thereby diffracts and deflects the guided wave in a direction which amplifies the deflection of the guided wave due to the diffraction thereof; and the first and second surface elastic wave generating means being arranged such that the frequencies and directions of the first and second surface elastic waves may be continuously varied while the following conditions are met:

$$|k_1| + |K_1| = |k_2|$$

$$|k_2| + |K_2| = |k_3|$$

where $|k_1|$ is the wave vector of the guided wave before it is diffracted by the first surface elastic wave, $|k_2|$ is the wave vector of the guided wave after it is diffracted by the first surface elastic wave, $|k_3|$ is the wave vector of the guided wave diffracted by the second surface elastic wave, and $|K_1|, |K_2|$ are the wave vectors of the first and second surface elastic waves.

According to the present invention, a second light beam deflector includes an optical waveguide made of a material capable of propagating surface elastic waves therethrough and exhibiting electrooptic effects, and further comprises:

an electrooptic light switch which diffracts a single light beam, which is introduced into the optical waveguide and guided therethrough, and divides it into first and second guided waves, said electrooptic light switch varying an electric field applied to the optical waveguide, which in turn varies the efficiency with which the light beam is diffracted and thereby the ratio between the intensities of the first and second guided waves;

first surface elastic wave generating means for generating in the optical waveguide a first surface elastic wave which travels across the path of the first guided wave traveling in the optical waveguide and thereby diffracts and deflects the first guided wave;

second surface elastic wave generating means for generating in the optical waveguide a second surface elastic wave which travels across the path of the first guided wave, which is diffracted by the first surface elastic wave and thereby diffracts and deflects the second guided wave in a direction which amplifies the deflection of the guided wave due to the diffraction thereof;

third surface elastic wave generating means for generating in the optical waveguide a third surface elastic wave which travels across the path of the second guided wave traveling in the optical waveguide and thereby diffracts and deflects the second guided wave;

fourth surface elastic wave generating means for generating in the optical waveguide a fourth surface elastic wave which travels across the path of the second guided wave, which is diffracted by the third surface elastic wave, and thereby diffracts and deflects the second guided wave in a direction which amplifies the deflection of the second guided wave due to the diffraction thereof;

the first and second surface elastic wave generating means being arranged such that the frequencies and directions of the first and second surface elastic waves may be continuously varied while the following conditions are met:

$$|k_1| + |K_1| = |k_2|$$

$$|k_2| + |K_2| = |k_3|$$

where $|k_1|$ is the wave vector of the first guided wave before it is diffracted by the first surface elastic wave $|k_2|$ is the wave vector of the first guided wave after it is diffracted by the first surface elastic wave, $|k_3|$ is the wave vector of the first guided wave diffracted by the second surface elastic wave, and $|K_1|, |K_2|$ are the wave vectors of the first and second surface elastic waves;

the third and fourth surface elastic wave generating means being arranged such that the frequencies and directions of the third and fourth surface elastic waves may be continuously varied while the following conditions are met:

$$|k_4| + |K_3| = |k_5|$$

$$|k_5| + |k_4| = |k_6|$$

where $|k_4|$ is the wave vector of the second guided wave before it is diffracted by the third surface elastic wave $|k_5|$ is the wave vector of the second guided wave after it is diffracted by the third surface elastic wave, $k_6$ is the wave vector of the second guided wave diffracted by the fourth surface elastic wave, and $|K_3|, |K_4|$ are the wave vectors of the third and fourth surface elastic waves; and the first, second, third, and fourth surface elastic wave generating means being arranged such that the first and second guided waves emitted out of the optical waveguide will scan a surface along respective aligned lines, ends of which lines are adjacent to each other.

According to the present invention, a third light beam deflector includes the components of the second light beam deflector and a modulating circuit connected to the electrooptic light switch for controlling the voltage applied to the electrooptic light switch on the basis of an image signal, whereby the electrooptic light switch can double as a light modulator.

Each of the first, second, third, and fourth surface elastic wave generating means may comprise, for example, a tilted-finger chirped interdigital transducer having electrode fingers spaced at distances which vary stepwise and oriented in directions which vary stepwise, and a driver for applying an alternating voltage with a continuously varying frequency to the tilted-finger chirped interdigital transducer.

In the first light beam deflector, since the guided wave deflected by the first surface elastic wave is deflected again by the second surface elastic wave, a wide deflection angle range can be obtained without substantially increasing the frequency band of each of the first and second surface elastic waves.

The above advantage holds true for the second and third light beam deflectors. In the second and third light beam deflectors, a wide deflection angle range can also be attained by the second guided wave which is diffracted twice by the third and fourth surface elastic waves. Since two light beams deflected and emitted out of the optical waveguide trace a single line on a surface being scanned, the length over which the surface is scanned by the light beams is longer than that which can be achieved by the first light beam deflector.

In the second and third light beam deflectors, moreover, with the electrooptic light switch one mode at a time can be selected from modes in which the first and second guided waves travel in the optical waveguide and in which only one of the first and second guided waves travels in the optical waveguide. Accordingly, two beams having the same intensity may be combined such that they scan the surface along a long line, or one of the light beams which has an intensity twice as high as the intensity of the two beams combined together may be used to scan the surface along a line which is half the length of the line scanned by the combined light beams.

Since a light beam guided in the optical waveguide is modulated by the electrooptic light modulator in the first and third light beam deflectors, it is not necessary directly to modulate a drive signal applied to a recording light source or a semiconductor laser. The light beam modulating speed in the first and third light beam deflectors can be increased inasmuch as the modulation of the light beam can be varied instantaneously in response to variations in the voltage applied to the electrooptic light modulator.

According to the present invention, a fourth light beam deflector passes a guided wave through an optical waveguide made of a material capable of propagating surface elastic waves, and diffracts and deflects the guided wave with surface elastic waves, the optical waveguide exhibiting electrooptic effects. The fourth light beam deflector further includes an electrooptic light switch, and first, second, third, and fourth surface elastic wave generating means which are identical to those of the second light beam deflector, with the first, second, third, and fourth surface elastic wave generating means being arranged such that the first and second guided waves emitted out of the optical waveguide will scan a surface without overlapping each other.

A fifth light beam deflector includes the components of the fourth light beam deflector and a modulating circuit connected to the electrooptic light switch for controlling the voltage applied to the electrooptic light switch on the basis of an image signal, whereby the electrooptic light switch can double as a light modulator.

When light beams are deflected by the fourth and fifth light beam deflectors, the two light beams emitted out of the optical waveguide scan respective independent areas on a surface being scanned. Therefore, different images can be recorded or read out. Since the light beams are deflected by the respective surface elastic waves, the deflection angle range attained by each of the surface elastic waves can be utilized to record or read out a single image.

Inasmuch as the first (second) guided wave deflected by the first (third) surface elastic wave is deflected again by the second (fourth) surface elastic wave, the deflection angle range for recording or reading out one image is very large.

In the fourth and fifth light beam deflectors, moreover, with the electrooptic light switch one mode at a time can be selected from modes in which the first and second guided waves travel in the optical waveguide and in which only one of the first and second guided waves travels in the optical waveguide. Accordingly, two beams having the same intensity may be combined such that they scan the surface, or one of the light beams which has an intensity twice as high as the intensity of each of the two beams may be used to scan the surface.

Since a light beam guided in the optical waveguide is modulated by the electrooptic light modulator in the fifth light beam deflector, as with the first and third light beam modulators, it is not necessary directly to modulate a drive signal applied to a recording light source or a semiconductor laser. The light beam modulating speed in the first and third light beam deflectors can be increased inasmuch as the modulation of the light beam can be varied instantaneously in response to variations in the voltage applied to the electrooptic light modulator.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3(a) and 3(b) show the manner in which a light beam is deflected by the light beam deflector shown in FIG. 1;

DESCRIPTION OF THE PREFERRED EMBODIMENTS

Figure 1:
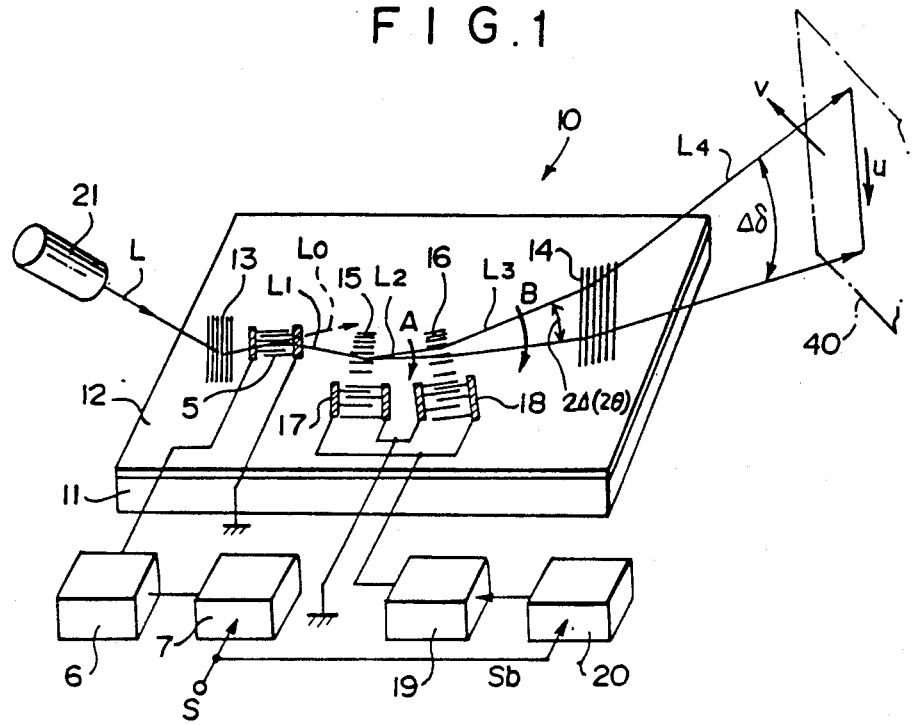
FIG. 1 is a schematic perspective view of a light beam deflector according to a first embodiment of the present invention.

Like or corresponding parts are denoted by like or corresponding reference characters throughout the drawings.

FIG. 1 shows a light beam deflector according to a first embodiment of the present invention. The light beam deflector, generally designated by the reference numeral 10, comprises a slab-shaped optical waveguide 12 on a transparent substrate 11, a linear grating coupler (LGC) 13 on the optical waveguide 12 through which a light beam is introduced, another LGC 14 on the optical waveguide 12 from which a light beam is emitted, a pair of first and second tilted-finger chirped interdigital transducers (IDT) 17, 18 on the optical waveguide 12 for generating surface elastic waves 15, 16, respectively, in directions across guided waves traveling between the LGCs 13, 14, an electrooptic grating (EOG) 5 disposed on the optical waveguide 12 and serving as an electrooptic light beam modulator, a high-frequency amplifier 19 for applying a high-frequency voltage to the tilted-finger chirped IDTs 17, 18, which generates the surface elastic waves 15, 16, and a sweeper 20 for continuously varying or sweeping the frequency c,f the voltage applied to the amplifier 19.

In the first embodiment, the substrate 11 is in the form of a wafer of $LiNbO_3$, for example, and a Ti-diffused film, for example, is provided on the surface of the wafer and forms the optical waveguide 12. However, the substrate 11 may be a crystalline substrate of sapphire, Si, or the like, and the optical waveguide 12 may comprise a film of any other suitable materials formed by sputtering, evaporation, or the like. Optical waveguides are described in detail in *Integrated Optics* edited by T. Tamir, Topics in Applied Physics, Vol. 7, published by Springer-Verlag, 1975, and *Optical Integrated Circuits* written by Nishihara, Haruna and Suhara, and published by Ohm Co., 1985. The optical waveguide 12 of the present invention may be any of the known optical waveguides. However, the optical waveguide 12 should be made of a material such as diffused Ti capable of propagating a surface elastic wave. The optical waveguide 12 may be of a laminated structure of two or more films or layers.

The tilted-finger chirped IDTs 17, 18 and the EOG 5 may be formed as follows. For Example, a positive electron beam resist is coated on the surface of the optical waveguide 12. Next, an electrically conductive thin film of Au is evaporated onto the positive electron beam resist and an electrode pattern is then printed with an electron beam. The thin film of Au is peeled off, thereafter the electrode pattern is developed. Then thin films of Cr and Al are evaporated onto the surface formed thus far, and the unnecessary layers are lifted off in an organic solution. If the substrate 11 and the optical waveguide 12 are made of a piezoelectric material, then the tilted-finger chirped IDTs 17, 18 which generate the surface elastic waves 15, 16 may directly be disposed in the optical waveguide 12 or on the substrate 11. If the substrate 11 and the optical waveguide 12 are not made of a piezoelectric material, then a piezoelectric thin film of ZnO, for example, is deposited on a portion of the substrate 11 or the optical waveguide 12 by evaporation, sputtering, or the like, and then the IDTs 17, 18 are formed on the piezoelectric thin film.

A light beam L to be deflected is emitted from a light source 21 such as a semiconductor laser toward the LGC 13. The light beam L (parallel-ray beam) is introduced into the optical waveguide 12 by the LGC 13, travels in a guided mode through the optical waveguide 12, and is then applied to the EOG 5. If the light beam L is a divergent beam, a focusing grating coupler (FGC) may be employed in place of the LGC 13 to convert the convergent light beam into a parallel-ray beam and introduce the parallel-ray beam into the optical waveguide 12.

A voltage V is applied to the EOG 5 by an EOG driver 6. The magnitude of the voltage V is varied by a modulating circuit 7 in response to an image signal applied to the modulating circuit 7. Specifically, if the guided wave is modulated in intensity, the magnitude of the voltage V is continuously varied, and if the guided wave is selectively turned on and off, one of two discrete values is selected at any one time as the magnitude of the voltage V. The EOG 5, which comprises a diffraction grating, serves to diffract the guided wave L, i.e., produce a diffracted light beam $L_1$ which travels in the direction indicated by the solid line and a zero-order light beam $L_0$ which travels in the direction indicated by the broken line. When an electric field is applied to the optical waveguide 12 by the EOG 5, the refractive index of the optical waveguide 12 varies due to electrooptic effects, thus varying the efficiency with which the guided wave L is diffracted. Since the diffraction efficiency depends on the magnitude of the voltage V applied to the EOG 5, the diffracted light beam $L_1$ is modulated by the image signal S.

The EOG 5 in this embodiment has an electrode finger line width of 3.75 μm, a periodic electrode finger pitch or interval of 15 μm, an effective electrode finger length of 1.3 mm, and 100 electrode finger pairs. The EOG 5 achieved a maximum diffraction efficiency $\eta = 93\%$ and a modulation frequency $f_M = 25$ MHz. The EOG 5 can be fabricated by the known photolithographic process.

The guided wave $L_1$ emitted from the EOG 5 is diffracted (Bragg diffraction) into a guided wave $L_2$ due to an acoustooptic interaction between itself and the first surface elastic wave 15 produced by the first tilted-finger chirped IDT 17. The guided wave $L_2$ is further diffracted in a direction which amplifies the deflection thereof, due to an electroacoustic interaction between itself and the surface elastic wave 16 produced by the second tilted-finger chirped IDT 18. Since the frequency of the alternating voltage applied to the first tilted-finger chirped IDT 17 varies continuously, the frequency of the first surface elastic wave 15 also varies continuously. As is apparent from equation (1) above, because the angle through which the guided wave $L_2$, which was diffracted by the surface elastic wave 15, is deflected is substantially proportional to the frequency of the surface elastic wave 15, the guided wave $L_2$ is continuously deflected as indicated by the arrow A. Since the frequency of the second surface elastic wave 16 which deflects the guided wave $L_2$ also varies continuously, the the guided wave $L_2$ that has passed through the second surface elastic wave 16 is continuously deflected into a guided wave $L_3$ as indicated by the arrow B.

The guided wave $L_3$ is then emitted as a light beam $L_4$ out of the light beam deflector 10, and the light beam $L_4$ scans a photosensitive medium 40 in a main scanning direction indicated by the arrow u. At the same time, the photosensitive medium 40 is moved by a feed means (not shown) in an auxiliary scanning direction indicated by the arrow v which is substantially perpendicular to the main scanning direction. Therefore, the photosensitive medium 40 is two-dimensionally scanned by the light beam $L_4$. Inasmuch as the light beam $L_4$ is modulated by the image signal S, an image represented by the image signal S is recorded on the photosensitive medium 40.

In order to synchronize one main scanning line of the image signal S with a main scanning cycle of the light beam $L_4$, a blanking signal $S_b$ contained in the image signal S may be used as a trigger signal to control the timing of application of the voltage to the IDTs 17, 18. The blanking signal $S_b$ may also be used to control the timing of feeding of the photosensitive medium 40 with the feed means to achieve synchronism between main and auxiliary scanning cycles.

Figure 2:
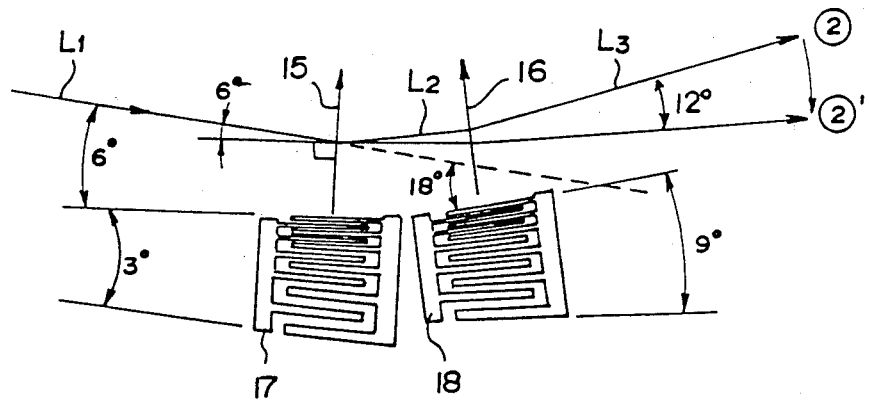
FIG. 2 is an enlarged plan view of a portion of the light beam deflector shown in FIG. 1.

The deflection angle range $2\Delta(2\theta)$ of the guided wave $L_3$ will be described with reference to FIG. 2. FIG. 2 illustrates in detail the configuration and location of the first and second tilted-finger chirped IDTs 17, 18. As shown in FIG. 2, each of the first and second tilted-finger chirped IDTs 17, 18 has electrode fingers spaced at distances or intervals which vary stepwise at a constant rate of change. The directions of orientation of the electrode fingers also vary stepwise at a constant rate of change. The first and second tilted-finger chirped IDTs 17, 18 are arranged such that the ends thereof (upper ends as shown) having shorter distances between the electrode fingers are positioned closer to the guided wave. When the frequency of the applied voltage varies, the first and second tilted-finger chirped IDTs 17, 18 produce surface elastic waves 15, 16 at a maximum frequency $f_2=2$ GHz from the upper ends thereof and a minimum frequency $f_1=1$ GHz from the lower ends thereof. The electrode fingers at the upper and lower ends, respectively, of the first tilted-finger chirped IDT 17 are tilted at 3° with respect to each other, and the IDT 17 is arranged such that the electrode finger at the upper end is tilted at 6° with respect to the direction of travel of the guided Wave $L_1$ and the electrode finger at the lower end is tilted at 3° with respect to the direction of travel of the guided wave $L_1$. The electrode fingers at the upper and lower ends, respectively, of the second tilted-finger chirped IDT 18 are tilted at 9° with respect to each other, and the IDT 18 is arranged such that the electrode finger at the upper end is tilted at 18° with respect to the direction of travel of the guided wave $L_1$ and the electrode finger at the lower end is tilted at 9° with respect to the direction of travel of the guided wave $L_1$. Ground electrodes of the first and second tilted-finger chirped IDTs 17, 18 may be integrally formed with each other. The tilted-finger chirped IDTs described above are described in detail in the literature, referred to above, written by C. S. TSAI.

When the surface elastic waves 15, 25 having a frequency of 2 GHz are generated from the first and second tilted-finger chirped IDTs 17, 18, the light beam is diffracted as indicated by (2) in FIG. 2. In this case, the guided wave $L_1$ is applied at an incident angle of 6° to the 2 GHz surface elastic wave 15, and the incident angle meets the conditions for Bragg diffraction. More specifically, if it is assumed that the guided wave $L_1$ has a wave vector $|k_1|$, the diffracted guided wave $L_2$ a wave vector $|k_2|$, and the surface elastic wave 15 a wave vector $|K_1|$, the following relationship is met, as shown in FIG. 3(a):

$$|k_1| + |K_1| = |k_2|$$

The direction of travel of the diffracted guided wave $L_2$ is the same as the direction of the vector $k_2$ (the deflection angle $\alpha = 2\theta = 12°$). At this time, the surface elastic wave 16 having a frequency of 2 GHz is excited by the electrode finger (lying at an angle of 12° with respect to the upper end of the first tilted-finger chirped IDT 17) at the upper end (FIG. 2) of the second tilted-finger chirped IDT 18 and travels in a direction normal to that electrode finger. Therefore, the angle of incidence of the guided wave $L_2$ upon the surface elastic wave 16 is 6°. Since the surface elastic wave 16 has the same wavelength as that of the surface elastic wave 15, the Bragg conditions for diffraction are met. That is, if it is assumed that the guided wave $L_3$ diffracted by the surface elastic wave 16 has a wave vector $|k_3|$, and the surface elastic wave 16 a wave vector $|K_2|$, the following relationship is met, as shown in FIG. 3(a):

$$|k_2| + |K_2| = |k_3|$$

The frequencies of the surface elastic waves 15, 16 are gradually lowered from 2 GHz. Since the magnitudes $|K_1|, |K_2|$ of the wave vectors $|K_1, K_2|$ of the surface elastic waves 15, 16 are $2\pi/\Lambda$ where $\Lambda$ is the wavelength of the surface elastic waves 15,16, the magnitudes of the wave vectors are proportional to the frequencies of the surface elastic waves 15, 16. When the frequencies of the surface elastic waves 15, 16 are 1 GHz, the magnitudes of the wave vectors $|K_1, |K_2|$ of the surface elastic waves 15, 16 are ½ of their magnitudes when the frequencies are 2 GHz. The directions of travel of the surface elastic waves 15, 16 at this time, i.e., the directions of the wave vectors $|K_1, |K_2|$ at the time the surface elastic waves 15, 16 have a frequency of 2 GHz, are angularly displaced by 3° and 9°, respectively, from the directions of the wave vectors $|K_1, |K_2|$ of the surface elastic waves 15, 16 at the time their frequencies are 1 GHz, since the electrode fingers of the first and second tilted-finger chirped IDTs 17, 18 which excite the 1 GHz surface elastic waves 15, 16 are tilted by 3° and 9°, respectively, from the electrode fingers thereof which excite the 2 GHz surface elastic waves 15, 16. Since a≃b in FIG. 3(a), the wave vectors $|K_1, |K_2|$ of the 1 GHz surface elastic waves 15, 16 are as shown in FIG. 3(b).

The above relationships:

$$|k_1| + |K_2| = |k_2|$$
$$|k_2| + |K_2| = |k_3|$$

are established when the frequencies of the surface elastic waves 15, 16 are 1 GHz.

The magnitude $|k_1|$ of the wave vector $|k_1|$ is $n \cdot 2\pi/\Lambda$ (n is the refractive index) where $\Lambda$ is the wavelength of the guided wave $L_1$, and the magnitudes of the wave vectors of the guided waves $L_2, L_3$ are also $n \cdot 2\pi/\Lambda$. Therefore, the following relationship is satisfied at all times:

$$||k_1| = ||k_2| = ||k_3|$$

Since the magnitude of the wave vector $|K_1|$ of the surface elastic wave 15 is $2\pi/\Lambda$ where $\Lambda$ is the wavelength thereof, and the wavelength of the surface elastic wave 5 is the same as the wavelength of the surface elastic wave 16, the following relationship is obtained:

$$||K_1| = ||K_2|$$

The directions of the wave vectors $|K_1, |K_2|$ are varied at respective inherent rates of change when the frequencies of the surface elastic waves 15, 16 are changed from 2 GHz to 1 GHz as described above. Consequently, while the surface elastic waves 15, 16 are being changed from 2 GHz to 1 GHz, the above relationships in equations (2), and the Bragg conditions for diffraction of the guided wave $L_1$ by the surface elastic wave 15 and the Bragg conditions for diffraction of the guided wave $L_2$ by the surface elastic wave 16 are met at all times.

As can be understood from the above description, when the frequencies of the surface elastic waves 15, 16 are 2 GHz and 1 GHz, the directions of travel of the guided wave $L_3$ which has been diffracted twice are the same as the direction of the vector $k_3$ in FIG. 3(a) and the direction of the vector $k_3$ in FIG. 3(b), respectively, (these vector directions are indicated by (2) and (2)', respectively, in FIG. 2). The difference between these directions is $2\Delta(2\theta) = 24 - 12 = 12°$. The light beam deflector 50 therefore provides a wide deflection angle range of 12° in the optical waveguide. If the light beam were deflected by only one surface elastic wave with its frequency varying from 1 GHz to 2 GHz (the frequency range is 1 octave so as not to be affected by secondary diffracted light), then the deflection angle range would be 6°.

The lowering of the frequencies of the surface elastic waves 15, 16 below 1 GHz causes the guided wave $L_3$ to be deflected to a greater degree beyond the position indicated at (2)' in FIG. 3(b). Since the guided wave $L_2$ that is diffracted once is emitted, though only slightly, toward that position when the surface elastic wave frequency is 2 GHz, it is preferable to employ the range between (2) and (2)' in FIG. 3(b) as a light beam deflection range.

The deflection angle $\Delta\delta$ of the light beam $L_4$ emitted from the optical waveguide 12 is wider than the deflection angle range $2\Delta(2\theta)$ in the optical waveguide since the refractive index of the optical waveguide 12 is larger than the refractive index of air.

Modifications of the light beam deflector 10 will be described below. In the illustrated embodiment, the frequencies of the surface elastic waves 15, 16 are continuously varied from 2 GHz to 1 GHz. However, they may be continuously varied from 1 GHz to 2 GHz to deflect the light beam $L_4$ in the opposite direction. The light beam $L_4$ can be reciprocally deflected if the surface elastic wave frequency is varied from 2 GHz to 1 GHz to 2 GHz to 1 GHz, so that the photosensitive medium 40 can be reciprocally scanned by the light beam.

In the illustrated embodiment, the angle of incidence of the guided wave $L_1$ upon the surface elastic wave 15 having a frequency of 2 GHz (i.e., the angle formed between the electrode finger of the first tilted-finger chirped IDT 17 which excites the surface elastic wave having a frequency of 2 GHz and the direction of travel of the guided wave $L_1$) is 6°, and the angles formed between the electrode fingers of the second tilted-finger chirped IDTs 18 which excite the surface elastic waves having frequencies of 2 GHz and 1 GHz and the direction of travel of the guided wave $L_1$ are 18° and 9°, respectively. However, when the minimum and maximum frequencies of the surface elastic waves 15, 16 are generally indicated by $f_1$, $f_2$ ($f_2=2f_1$), respectively, the above Bragg conditions for diffraction are met at all times if the angles, which have been set to 6°, 3°, 18°, 9° above, are selected as $\theta$, $\theta/2$, $3\theta$, $3\theta/2$, respectively, as is apparent from FIGS. 3(a) and 3(b).

Even when the configurations of the tilted-finger chirped IDTs 17, 18 are defined according to a predetermined value of $\theta$, the minimum and maximum frequencies $f_1$, $f_2$ of the surface elastic waves 15, 16 may not necessarily be set at $f_2=2f_1$. The maximum frequency $f_2$ may be slightly lower then $2f_1$. However, as long as the tilted-finger chirped IDTs 17, 18 are configured in the manner described above, the IDT should be used to its best advantage, and the surface elastic wave frequency should preferably be varied from $f_1$, at which the minimum deflection angle range can be achieved without secondary diffracted light produced at the minimum frequency $f_1$ entering the deflection angle range, to $f_2=2f_1$.

It is not necessarily required according to the present invention that the minimum and maximum frequencies $f_1$, $f_2$ of the surface elastic waves 15, 16 be selected so that $f_2=2f_1$ and the frequencies of the surface elastic waves 15, 16 be equal to each other. Even if the frequencies and the directions of travel of the surface elastic waves 15, 16 are independently varied the above relationships in equations (2) can be satisfied by the configurations and locations of the first and second tilted-finger chirped IDTs 17, 18.

If the frequencies of the surface elastic waves 15, 16 should be varied in the same manner as in the above embodiment, then the two tilted-finger chirped IDTs can be driven by a common driver. It is advantageous to employ only one driver because the drivers are expensive.

Figure 4:
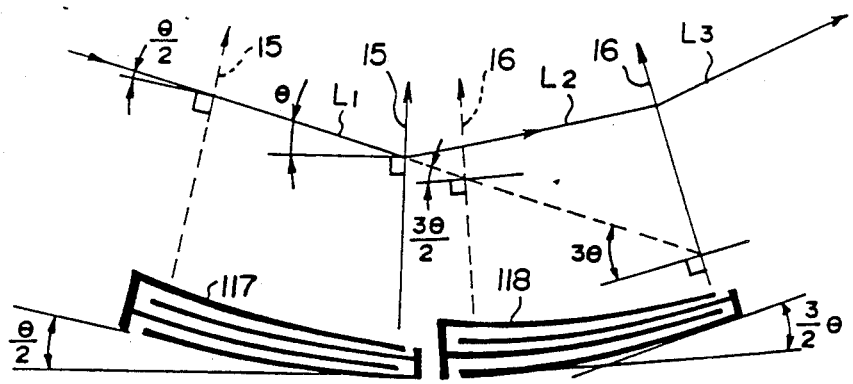
FIG. 4 is a plan view of another means for generating a surface elastic wave in the present invention.

The light beam deflector of the present invention may use curved-finger IDTs in place of the tilted-finger chirped IDTs 17, 18, the curved-finger IDTs each having arcuate electrode fingers which are spaced at distances that vary stepwise. FIG. 4 shows one pattern in which such curved-finger IDTs may be arranged. First and second curved-finger IDTs 117, 118 are constructed such that righthand (as shown) end electrode finger portions generate surface elastic waves 15, 16 having a maximum frequency of $f_2$ and lefthand (as shown) end electrode finger portions generate surface elastic waves 15, 16 (indicated by the broken lines) having a minimum frequency of $f_1$. With $f_2=2f_1$ and the angle of incidence Of the guided wave $L_1$ upon the first surface elastic wave 15 of the maximum frequency $f_2$ equal to $\theta$ as shown in FIG. 4, the IDTs 117, 118 should be arranged such that the lefthand end electrode portion of the first curved-finger IDT 117 lies at an angle of $\theta/2$ with respect to the direction of travel of the guided wave $L_1$, and the righthand and lefthand end electrode finger potions of the second curved-finger IDT 118 lie at angles of $3\theta$ and $3\theta/2$ respectively with respect to the direction of travel of the guided wave $L_1$.

If the optical waveguide 12 is made of ZnO rather than Ti-diffused $LiNbO_3$, a deflection angle range of about $2\Delta2(\theta)=8°$ can be achieved by selecting the maximum and minimum frequencies of the surface elastic waves 15, 16 to be 1.0 GHz and 0.5 GHz, respectively, for example.

The light beam deflector of the present invention may be arranged to propagate such that it propagates three or more surface elastic waves in the optical waveguide in order to deflect a single guided wave three or more times.

To allow the light beam to be introduced into the optical waveguide 12 and emitted from the optical waveguide 12, coupler prisms or the like may be employed rather than the LGCs 13, 14. Alternatively, the light beam may be directly applied to an end face of the optical waveguide 12, and the light beams may be directly emitted from the opposite end face of the optical waveguide 12. If the light beam L is divergent in nature, it may be converted into parallel-ray beams by a waveguide lens or an ordinary external lens, and the light beam $L_4$ emitted out of the optical waveguide 12 may be converged by such a waveguide lens or an ordinary external lens.

The aforesaid modifications may be employed in other embodiments of the present invention which will be described below.

Figure 5:
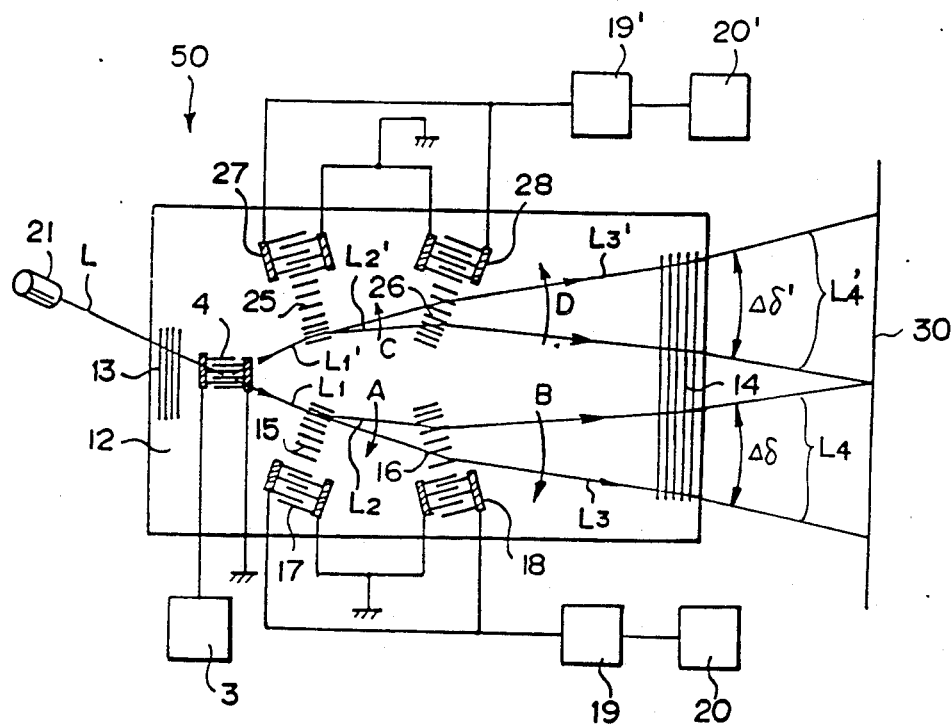
FIG. 5 is a schematic plan view of a light beam deflector according to a second embodiment of the present invention.

FIG. 5 shows a light beam deflector 50 according to a second embodiment of the present invention. Those parts shown in FIG. 5 which are identical to those of FIG. 1 are denoted by identical reference numerals, and will not be described unless particularly required. The light beam deflector 50 includes first and third tilted-finger chirped IDTs 17, 27, one each positioned on opposite sides of the path of a guided wave, and second and fourth tilted-finger chirped IDTs 18, 28, one each positioned on each side of the guided wave path. The third and fourth IDTs 27, 28 and the first and second IDTs 17, 18 are symmetrically arranged vertically (as shown in FIG. 5). The third and fourth IDTs 27, 28 are driven by a high-frequency amplifier 19' and a sweeper 20' which are identical to the high-frequency amplifier 19 and the sweeper 20 which drive the first and second IDTs 17, 18. An EOG 4 serving as an electrooptic switch is located in the path along which the light beam L is guided in the optical waveguide 12. The EOG 4 serves as a diffraction grating for diffracting the guided wave L applied thereto, i.e., dividing the guided wave L into a first guided wave $L_1$ (zero-order light beam) and a second guided wave $L_1'$ (diffracted light beam). Three different voltages can selectively be applied to the EOG 4 by a switch driver 3 to switch the diffraction efficiency between a value close to 0%, a value close to 100%, and a value close to 50%. Therefore, depending on the voltage applied to the EOG 4, the EOG 4 allows substantially only the guided wave $L_1$ to travel in the optical waveguide 12, or substantially only the guided wave $L_1$ to travel in the optical waveguide 12, or the guided waves $L_1$, $L_1'$ having equal intensities to travel in the optical waveguide 12.

When the guided wave $L_1$ travels in the optical waveguide 12, it can be deflected through a wide angle range by the first and second surface elastic waves 15, 16, as with the first embodiment.

As with the first and second tilted-finger chirped IDTs 17, 18, an alternating voltage having a swept frequency is also applied to the third and fourth tilted-finger chirped IDTs 27, 28. Therefore, when the guided wave $L_1'$ travels in the optical waveguide 12, a guided wave $L_2'$ that has passed through a third surface elastic wave 25, which is produced by the IDT 27, is continuously deflected as indicated by the arrow C. The guided wave $L_2'$ thus diffracted and deflected is further diffracted in a direction which amplifies its deflection, due to an acoustooptic interaction between itself and a fourth surface elastic wave 26 produced by the IDT 28. A guided wave $L_3$ which has passed through the fourth surface elastic wave 26 is thus continuously deflected through a large angle as indicated by the arrow D.

In the second embodiment, the third and fourth tilted-finger chirped IDTs 27, 28 are identical in construction to the first and second tilted-finger chirped IDTs 17, 18, except that they are symmetrically arranged on an opposite side of the optical waveguide 12, and voltages are applied in the same manner as described above to these IDTs. Thus, if it is assumed that the second guided wave $L_1'$ before it is diffracted by the third surface elastic wave 25 has a wave vector $|k_4$, the second guided wave $L_2'$ after it is diffracted by the third surface elastic wave 25 has a wave vector $|k_5$, the second guided wave $L_3'$ diffracted by the fourth surface elastic wave 26 has a wave vector $|k_6$, and the third and fourth surface elastic waves 25, 26 have respective wave vectors $|K_3$, $|K_4$, the following relationships are always met:

$$|k_4 + |K_3 = |k_5$$

$$|k_5 + |K_4 = |k_6$$

The deflection angle range $2\Delta(2\theta)'$ of the guided wave $L_3'$ is 12°, which is the same as the deflection angle range $2\Delta(2\theta)$ of the guided wave $L_3$.

Figure 6:
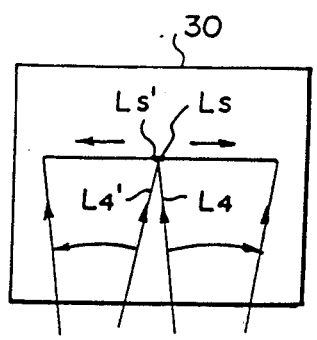
FIGS. 6, 7, and 8 show the directions in which two light beams are deflected in the light beam deflector shown in FIG. 5.

If the guided wave L is divided into the guided waves $L_1$, $L_1'$ having equal intensities, both the guided waves $L_3$, $L_3'$ deflected as described above are emitted as light beams $L_4$, $L_4'$ from the optical waveguide 12 by the LGC 14. The emitted light beams $L_4$, $L_4'$ one-dimensionally scan a surface 30. The deflection angle ranges $\Delta\delta$, $\Delta\delta'$ of the light beams $L_4$, $L_4'$ are wider than the deflection angle ranges $2\Delta(2\theta)$, $2\Delta(2\theta)'$ of the guided waves $L_3$, $L_3'$. As shown in detail in FIG. 6, the first, second, third, and fourth tilted-finger chirped IDTs 17, 18, 27, 28 are positioned such that the lines traced on the surface 30 by the light beams $L_4$, $L_4'$ emitted from the optical waveguide 12 are linearly aligned, and Start of Scan (SOS) points Ls, Ls' of the light beams $L_4$, $L_4'$ are located adjacent to each other. Therefore, one main scanning line is provided on the surface 30 by the light beams $L_4$, $L_4'$. In cases where the deflection angle ranges of the guided waves $L_3$, $L_3'$ are the same as each other, the light beam deflector 50 can provide a scanning width or range which is twice as large as that which would have been possible if the applied light beam were deflected by the first surface elastic wave 15 and the second surface elastic wave 16. Stated otherwise, the light beam deflector 50 has an apparent deflection angle range which is twice as wide as that of the light beam deflector of the first embodiment.

Since only the first guided wave $L_1$ or the second guided wave $L_1'$ can be passed by the EOG 4 as described above, the surface 30 can be scanned only by the light beam $L_4$ or the light beam $L_4'$. In this case, the intensity of the scanning light beam is twice that which is available when the surface 30 is scanned by the two light beams $L_4$, $L_4'$.

To read out an image from the surface 30 (on which the recorded image may have originally been recorded as described above), light emitted, reflected, or passing through the image areas of the surface 30 which has been scanned by the light beams $L_4$, $L_4'$ is detected by respective photoelectric readout means so that image signals representing the recorded image are produced.

If the two light beams (guided waves) $L_1$, $L_1'$ were emitted from separate light sources, respectively, then the intensities of the light beams $L_1$, $L_1'$ would differ from each other due to the light sources' having varying light emission capabilities and light beams with different intensities being emitted from the light sources because of time-dependent variations in the light beam intensities. Therefore, if the light beam deflector 50 were used to record images, the image densities of the righthand and lefthand areas on the surface 30 would be different from each other, and if the light beam deflector 50 were used to read out recorded images, image signals produced from the righthand and lefthand areas on the surface 30 would vary from each other. According to the present invention, since the two light beams $L_1$, $L_1'$ are emitted by the common light source 21, the above problem does not occur insofar as the light beam L is split by the EOG 5 into the light beams $L_1$, $L_1'$ having the same intensity.

The IDTs 17, 18, 27, 28 may be arranged successively in an array on the righthand or lefthand side of the path of travel of the guided wave.

The light beam L may not necessarily be divided into two light beams of the same intensity. If the divided light beams (guided waves) $L_1$, $L_1'$ are different in intensity from each other, then a means for attenuating the guided wave of greater intensity is disposed in the optical waveguide 12, or the levels of the alternating voltages applied to the IDTs 17, 27, (18, 28) are varied according to the difference between the light beam intensities so that the efficiencies with which the first and second guided waves are diffracted by the surface elastic waves are different from each other. Therefore, the intensities of the light beams $L_4$, $L_4'$ will eventually be equal to each other. (In cases where the light beams $L_4$, $L_4'$ are modulated in an analog manner by an image signal because a halftone image is to be recorded, the intensities of these light beams are equalized with respect to the same image signal.) Even if two light sources are employed, the difference between the light beam intensities can be compensated for in the manner described above, but the problems of different intensities of the light beams $L_4$, $L_4'$ occurring due to the light sources' having varying light emission capabilities and time-dependent variations in the light beam intensities could not be eliminated. These problems do not take place in the light beam deflector of the invention because the attenuating means is provided.

Figure 7:
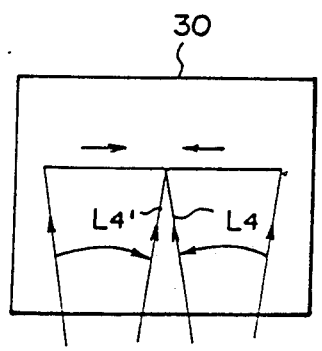
Figure 8:
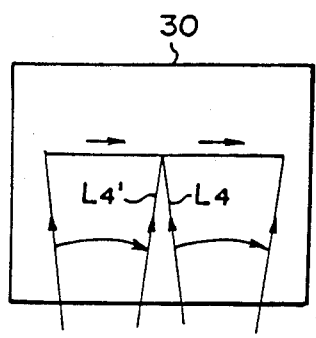

In the above embodiment, the SOS points $L_s$, $L_s'$ of the light beams $L_4$, $L_4'$ on the surface 30 are disposed adjacent to each other. However, the LDTs 17, 18 and 27, 28 may be arranged and the frequencies of the alternating voltages applied thereto may be varied such that End of Scan (EOS) points of the light beams $L_4$, $L_4'$ are located adjacent to each other as shown in FIG. 7, or the SOS point of one of the light beams $L_4$, $L_4'$ and the EOS point of the other light beam are located adjacent to each other as shown in FIG. 8.

The timing with which the light beams $L_4$, $L_4'$ are deflected may be such that their SOS or EOS, which are positioned adjacent to each other on the surface 30, may or may not be successive. For example, in FIG. 8, the timing of deflection of the light beams $L_4$, $L_4'$ may be selected such that the SOS point of the light beam $L_4$ follows the EOS point of the light beam $L_4'$ in time so that the surface 30 is scanned as if with a single light beam. Alternatively, the timing of deflection of the light beams $L_4$, $L_4'$ may be selected so that the light beams $L_4$, $L_4'$ will start scanning the surface 30 at the same time.

The length over which the surface 30 is scanned is the sum of the length over which it is scanned by the light beam $L_4$ deflected through the angle $\Delta\delta$ and the length over which it is scanned by the light beam $L_4'$ deflected through the angle $\Delta\delta'$. Since $\Delta\delta' = \Delta\delta$ in this embodiment, the length over which the surface 30 is scanned is four times the length over which it would be scanned by a light beam deflected only by a single surface elastic wave.

Figure 9:
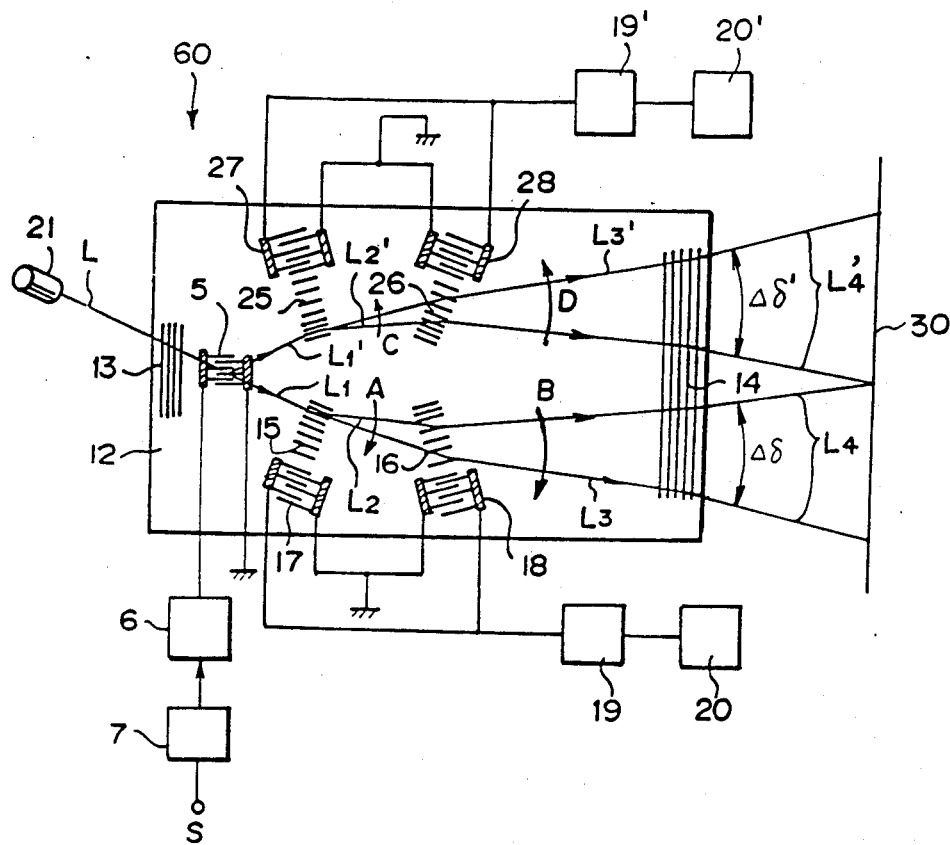
FIG. 9 is a schematic plan view of a light beam deflector according to a third embodiment of the present invention.

A light beam deflector according to a third embodiment of the present invention will be described below with reference to FIG. 9. The light beam deflector, denoted at 60, is different from the light beam deflector 50 shown in FIG. 5 in that the EOG 4 and the switch driver 3 shown FIG. 5 are replaced with an EOG 5, an EOG driver 6, and a modulating circuit 7 which are identical to those shown in FIG. 1. With the arrangement shown FIG. 9, the first guided wave $L_1$ or the second guided wave $L_1'$ can be modulated by the image signal S. To record an image with only the light beam $L_4$, the EOG 5 should be controlled so that the first guided wave $L_1$ be given a desired intensity based on the image signal S. For recording an image with only the light beam $L_4'$, the EOG 5 should be controlled so that the second guided wave $L_1'$ will be given a desired intensity based on the values of the image signal S.

As with the light beam deflector 50 according to the second embodiment, the EOG 5 in the third embodiment may be operated as an optical switch so that the surface 30 can be scanned only with the light beam $L_4$ or the light beam $L_4'$ or both. However, inasmuch as images cannot simultaneously be recorded by the two light beams $L_4$, $L_4'$, when an image is recorded by the light beam $L_4$, the third and fourth IDTs 27, 28 are de-energized, and when an image is recorded by the light beam $L_4'$, the first and second IDTs 17, 18 are de-energized.

Figure 10:
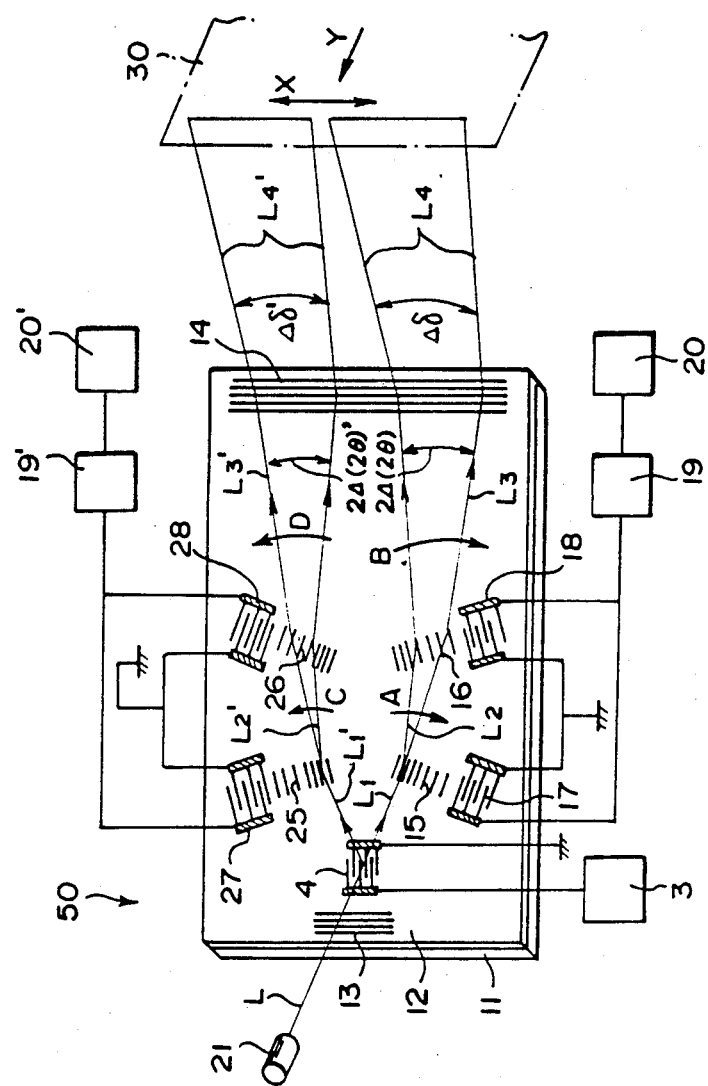
FIG. 10 is a schematic perspective view of a light beam deflector according to a fourth embodiment of the present invention.
Figure 11:
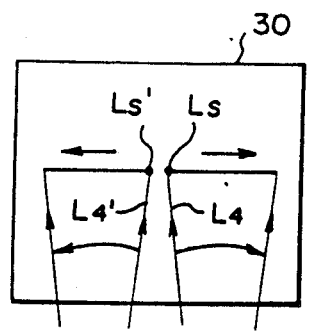
FIGS. 11, 12, and 13 illustrate the directions in which two light beams are deflected in the light beam deflectors shown in FIGS. 9 and 10.
Figure 12:
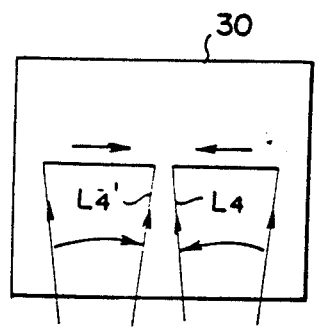

FIG. 10 shows a light beam deflector 150 in accordance with a fourth embodiment of the present invention. The light beam deflector 150 differs from the light beam deflector 50 according to the second embodiment shown in FIG. 5 with respect to the arrangement of the IDTs 17, 18, 27, 28. More specifically, in the light beam deflector 150, the first, second, third, and fourth IDTs 17, 18, 27, 28 are arranged such that the light beams $L_4$, $L_4'$ emitted out of the optical waveguide 12 do not overlap but run parallel to each other on the surface 30, as is also shown in FIG. 11. Therefore, separate main scanning lines, extending in the main scanning direction indicated by the arrow X, are formed respectively by the light beams $L_4$, $L_4'$ on the surface 30. By the surface's 30 being moved in an auxiliary scanning direction indicated by the arrow Y, perpendicular to the main scanning direction X, with a known auxiliary scanning means (not shown), different areas on the surface 30 can be two-dimensionally scanned by the respective light beams $L_4$, $L_4'$.

When the light beam deflector 150 is used to read out two images from the surface 30 (on which the two recorded images may have originally been recorded as described above), light emitted, reflected, or passing through the image areas of the surface 30 which have been scanned by the light beams $L_4$, $L_4'$, respectively, is detected by respective photoelectric readout means, and image signals that represent the recorded images are thereby produced.

The deflection angle ranges $2\Delta(2\theta)$, $2\Delta(2\theta)$ of the guided waves $L_3$, $L_3'$ are the same as those in the light beam deflector 50 of the second embodiment shown in FIG. 5.

In the light beam deflector 150, as described above, two light beams used to record or read out respective images are deflected by respective two surface elastic waves. Therefore, each of the images can be recorded or read out by a light beam which is deflected over the same wide deflection angle range as that which has been used to record an image with a single light beam.

If the two light beams (guided waves) $L_1$, $L_1'$ were emitted from separate light sources, respectively, then the intensities of the light beams $L_1$, $L_1'$ would differ from each other due to the light sources' having varying light emission capabilities and light beams with different intensities being emitted from the light sources because of time-dependent variations in the light beam intensities. Therefore, if images were recorded with the light beam deflector 150, the image densities of the righthand and lefthand images on the surface 30 would be different from each other, and if images were read out with the light beam deflector 150, image signals produced from the righthand and lefthand images on the surface 30 would vary from each other. According to the present invention, since the two light beams $L_1$, $L_1'$ are emitted by the common light source 21, the above problem does not occur insofar as the light beam L is split by the EOG 4 into the light beams $L_1$, $L_1'$ having the same intensity.

Figure 13:
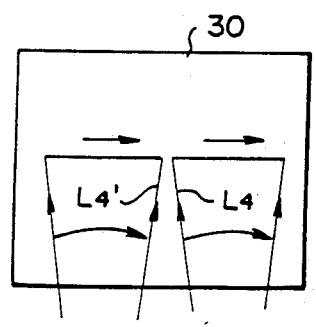

In the fourth embodiment, the SOS points $L_s$, $L_s'$ of the light beams $L_4$, $L_4'$ on the surface 30 are disposed adjacent to each other. However, the LDTs 17, 18 and 27, 28 may be arranged and the frequencies of the alternating voltages applied thereto may be varied such that the EOS points of the light beams $L_4$, $L_4'$ are located adjacent to each other as shown in FIG. 11, or the SOS point of one of the light beams $L_4$, $L_4'$ and the EOS point of the other light beam are located adjacent to each other as shown in FIG. 13.

Figure 14:
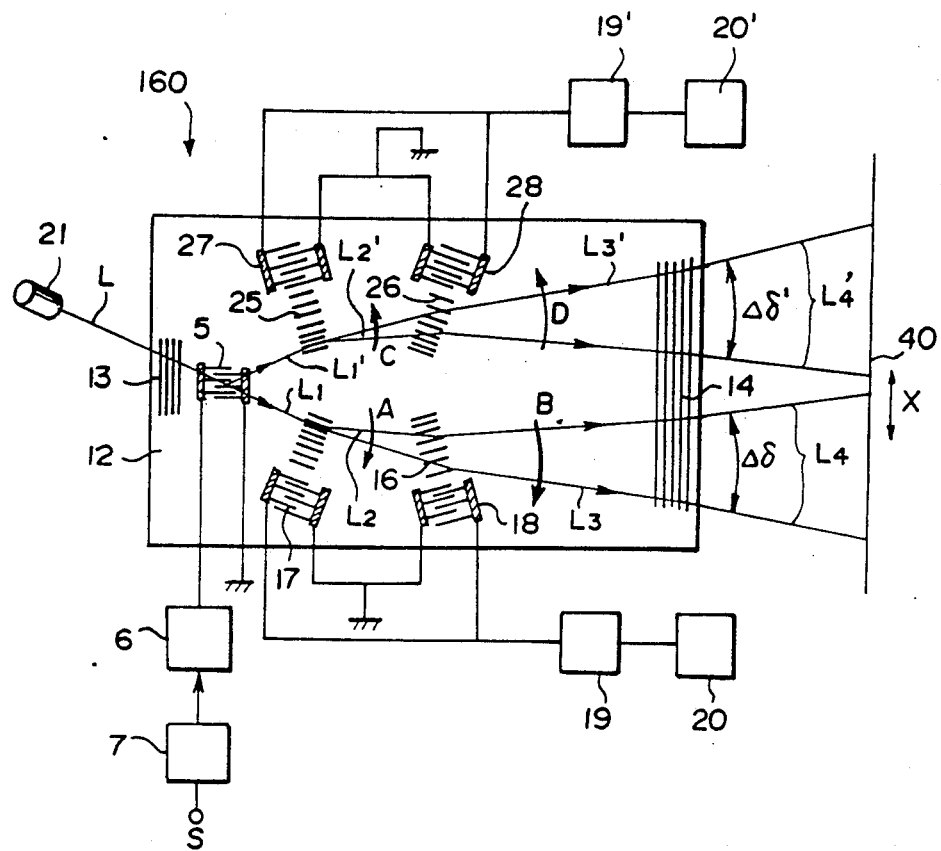
FIG. 14 is a schematic plan view of a light beam deflector according to a fifth embodiment cf the present invention.

According to a fifth embodiment shown in FIG. 14, a light beam deflector 160 differs from the light beam deflector 150 according to the fourth embodiment shown in FIG. 10 in that the EOG 4 and the switch driver 3 shown FIG. 10 are replaced with an EOG 5, an EOG driver 6, and a modulating circuit 7.

A voltage V is applied to the EOG 5 by the EOG driver 6. The magnitude of the voltage V is varied by the modulating circuit 7 in response to an image signal applied to the modulating circuit 7. Specifically, if the guided wave is modulated in intensity, the magnitude of the voltage V is continuously varied, and if the guided wave is selectively turned on and off, one of two discrete values is selected at any one time as the magnitude of the voltage V. The EOG 5, which comprises a diffraction grating, serves to diffract the guided wave L, i.e., produce a diffracted light beam $L_1'$ and a zero-order light beam $L_1$. When an electric field is applied to the optical waveguide 12 by the EOG 5, the refractive index of the optical waveguide 12 varies due to electrooptic effects, thus varying the efficiency with which the guided wave L is diffracted. Since the diffraction efficiency depends on the magnitude of the electric field, i.e., the voltage V applied to the EOG 5, the diffracted light beam $L_1'$ or the zero-order light beam $L_1$ is modulated by the image signal S.

The light beam $L_4$ or $L_4'$ emitted out of the light beam deflector 160 scans a photosensitive medium 40 in a main scanning direction as indicated by the arrow X. At the same time, the photosensitive medium 40 is moved by a feed means (not shown) in an auxiliary scanning direction which is substantially perpendicular to the main scanning direction. Therefore, the photosensitive medium 40 is two-dimensionally scanned by the light beam $L_4$ or $L_4'$. Inasmuch as the light beam $L_4$ is modulated by the image signal S, an image represented by the image signal S is recorded on the photosensitive medium 40.

As with the light beam deflector 150 according to the fourth embodiment, the EOG 5 in the fifth embodiment may also be operated as an optical switch so that the surface 30 can be scanned with only the light beam $L_4$ or the light beam $L_4'$ or both. However, inasmuch as images cannot simultaneously be recorded by the two light beams $L_4$, $L_4'$, when an image is recorded by the light beam $L_4$, the third and fourth IDTs 27, 28 are de-energized, and when an image is recorded by the light beam $L_4'$, the first and second IDTs 17, 18 are de-energized.

Figure 15:
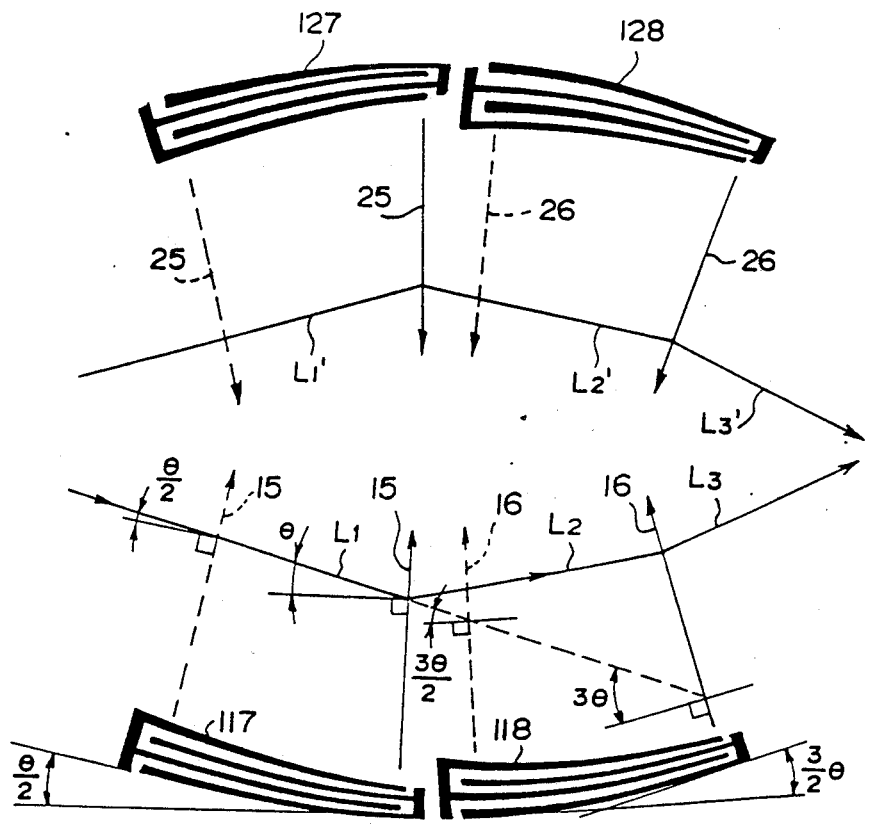
FIG. 15 is a plan view showing still another means for generating a surface elastic wave in the present invention.

The light beam deflectors of the present invention may use curved-finger IDTs in place of the tilted-finger chirped IDTs 17, 18, 27, 28, the curved-finger IDTs each having arcuate electrode fingers which are spaced at distances that vary stepwise. FIG. 15 shows one pattern in which such curved-finger IDTs may be arranged. First and second curved-finger IDTs 117, 118 may be constructed and arranged in the manner described above with reference to FIG. 4, and third and fourth curved-finger IDTs 127, 128 may be fabricated in the same manner as the first and second IDTs 117, 118.

With the arrangement of the present invention, since a light beam deflected by a surface elastic wave is further deflected by another surface elastic wave, a wide deflection angle range is obtained, and the intensity of the deflected light beam does not suffer from variations or fluctuation which depend on the deflection angle and which would otherwise be produced if a plurality of IDTs were switched into and out of operation. Consequently, the light beam deflector can record or read out images highly accurately. Since the deflection angle range is wide, the distance from the light beam deflector to the surface being scanned may be reduced, and therefore the size of a light scanning recording or reading apparatus in which the light beam deflector of the invention is incorporated may also be reduced.

According to the present invention, a wide deflection angle range can be obtained without having to increase the frequencies of the respective surface elastic waves. Where IDTs are employed as the means for generating surface elastic waves, therefore, the line widths of the IDTs are not required to be extremely small, and the IDTs used can be manufactured easily with the presently available techniques. Additionally, the frequencies of the alternating voltages applied to the IDTs are also not required to be extremely high, and hence drivers for the IDTs can be manufactured easily and inexpensively.

In one of the light beam deflectors of the present invention, the two light beams deflected by the respective surface elastic waves meet at the surface being scanned, thus providing a wide deflection angle range. Therefore, the distance from the light beam deflector to the surface being scanned may be reduced, and therefore the size of a light scanning recording or reading apparatus in which the light beam deflector of the invention is incorporated may also be reduced.

According to another light beam deflector of the present invention, the light beam traveling in the optical waveguide is modulated by the electrooptic modulator to prevent fluctuations in the wavelength of the recording light beam, fluctuations which would otherwise be caused if the drive signal applied to the recording light source or semiconductor laser were directly modulated. Therefore, the intensity of the recording light beam is prevented from fluctuating and also the scanning position, the position at which the desired surface is scanned by the recording light beam, does not vary, so that an image of higher quality with greater detail can be recorded. The light beam deflector can record images at a high speed since the electrooptic modulator can modulate the recording light beam at a much higher speed than the speed attained if the intensity of the surface elastic wave is controlled as a means of modulating the recording light beam.

In still another light beam deflector, two light beams which meet at the surface being scanned are guided and deflected in the common optical waveguide. Consequently, the scanning positions at which the surface is scanned by the respective light beams can be adjusted highly accurately and easily. In this light beam modulator, since a single light beam is divided into the two light beams and the two light beams are separately deflected, the intensities of the two light beams that meet at the surface being scanned can be made equal to each other at all times. In cases where the light beam deflector is incorporated into a light scanning recording or reading apparatus, a recorded image can be prevented from having different densities and an image signal read from a recorded image can be prevented from having different levels on the righthand and lefthand sides of the main scanning lines on the surface being scanned.

With a yet another light beam deflector of the present invention, the scanning position of a light beam can be changed by an electrooptic switch, and in addition, it is possible to switch between a mode in which a long scanning range is attained by a light beam having a relatively low intensity and another mode in which a relatively short scanning range is attained by a light beam having a high intensity. Hence, the light beam deflector may be employed in the manufacture of a light scanning recording or reading apparatus having many useful functions.

According to a further light beam deflector of the present invention, two light beams which have been diffracted twice by respective surface elastic waves scan different areas on a surface. This allows the deflection angle range for one image to be much greater than that attained with an arrangement in which the deflection angle range of a single light beam is divided so that two images can be recorded or read out. The light beam deflector thus makes it possible to record or read out large-sized images. As a very wide deflection angle range can be obtained by this light beam deflector, the distance from the light beam deflector to the surface being scanned may be reduced, and therefore the size of a light scanning recording or reading apparatus in which the light beam deflector of the invention is incorporated may also be reduced.

Moreover, two light beams for scanning respective surface areas parallel to each other are guided and deflected in a common optical waveguide. Therefore, the scanning positions of the two light beams can be adjusted highly accurately and easily.

In addition, since the two light beams are divided from a single light beam and deflected, the intensities of the two light beams which scan the surface can be made equal to each other at all times. In cases where the light beam deflector is incorporated into an apparatus for recording two images or reading out two images, recorded images on the righthand and lefthand sides are prevented from having different densities, or image signals read from righthand and lefthand images are prevented from having different levels.

Although certain preferred embodiments have been shown and described, it should be understood that many changes and modifications may be made therein without departing from the scope of the appended claims.

I claim:
1. A light beam deflector comprising:
   (i) an optical waveguide made of a material capable of propagating surface elastic waves therethrough and exhibiting electrooptic effects;
   (ii) an electrooptic modulator disposed in the path of a guided wave which is introduced into an optical waveguide and guided therethrough, which electrooptic modulator varies an electric field applied to said optical waveguide, which in turn varies the efficiency with which the guided wave is diffracted, thereby modulating the guided wave;
   (iii) first surface elastic wave generating means for generating in said optical waveguide a first surface elastic wave which travels across the path of the modulated guided wave travelling in said optical waveguide and thereby diffracts and deflects the modulated guided wave;
   (iv) second surface elastic wave generating means for generating in said optical waveguide a second surface elastic wave which travels across the path of the diffracted guided wave and thereby diffracts and deflects said guided wave in a direction which amplifies the deflection of the guided wave due to the diffraction thereof; and
   (v) said first and second surface elastic wave generating means being arranged such that the frequencies and directions of said first and second surface elastic waves may be continuously varied while the following conditions are met:

$$|k_1 + |k_1 = |k_2$$

$$|k_2 + |k_2 = |k_3$$

where $|k_1$ is the wave vector of the guided wave before it is diffracted by said first surface elastic wave, $|k_2$ is the wave vector of the guided wave after it is diffracted by said first surface elastic wave, $|k_3$ is the wave vector of the guided wave diffracted by said second surface elastic wave, and $|k_1, |k_2$ are the wave vectors of said first and second surface elastic waves.

2. A light beam deflector as claimed in claim 1, wherein said optical waveguide is made of a Ti-diffused film formed on a surface of a wafer made of one of $LiNbO_3$, Si, and a crystalline substrate of sapphire.

3. A light beam deflector as claimed in claim 1, wherein said first and second elastic wave generating means comprise tilted-finger chirped interdigital transducers.

4. A light beam deflector as claimed in claim 1, wherein said first and second elastic wave generating means comprise curved-finger chirped interdigital transducers.

5. A light beam deflector comprising:
   (i) an optical waveguide made of a material capable of propagating surface elastic waves therethrough and exhibiting electrooptic effects;
   (ii) an electrooptic light switch which diffracts a single light beam, which is introduced into the optical waveguide and guided therethrough, and divides it into first and second guided waves, said electrooptic light switch varying an electric field applied to said optical waveguide, which in turn varies the efficiency with which the light beam is diffracted, thereby varying the ratio between the intensities of said first and second guided waves;
   (iii) first surface elastic wave generating means for generating in said optical waveguide a first surface elastic wave which travels across the path of the first guided wave travelling in said optical waveguide and thereby diffracts and deflects the first guided wave;
   (iv) second surface elastic wave generating means for generating in said optical waveguide a second surface elastic wave which travels across the path of the first guided wave which is diffracted by said first surface elastic wave and thereby diffracts and deflects said second guided wave in a direction which amplifies the deflection of the guided wave due to the diffraction thereof;

(v) third surface elastic wave generating means for generating in said optical waveguide a third surface elastic wave which travels across the path of the second guided wave travelling in said optical waveguide and thereby diffracts and deflects said second guided wave;

(vi) fourth surface elastic wave generating means for generating in said optical waveguide a fourth surface elastic wave which travels across the path of the second guided wave which is diffracted by said third surface elastic wave and thereby diffracts and deflects said second guided wave in a direction which amplifies the deflection of the second guided wave due to the diffraction thereof;

(vii) said first and second surface elastic wave generating means being arranged such that the frequencies and directions of said first and second surface elastic waves may be continuously varied while the following conditions are met:

$$|k_1|+|K_1|=|k_2|$$

$$|k_2|+|K_2|=|k_3|$$

wherein $|k_1|$ is the wave vector of the first guided wave before it is diffracted by said first surface elastic wave, $|k_2|$ is the wave vector of the first guided wave after it is diffracted by said first surface elastic wave, $|k_3|$ is the wave vector of the first guided wave diffracted by said second surface elastic wave, and $|K_1|$, $|K_2|$ are the wave vectors of said first and second surface elastic waves;

(viii) said third and fourth elastic wave generating means being arranged such that the frequencies and directions of said third and fourth surface elastic waves may be continuously varied while the following conditions are met:

$$|k_4|+|K_3|=|k_5|$$

$$|k_5|+|K_4|=|k_6|$$

where $|k_4|$ is the wave vector of the second guided wave before it is diffracted by said third surface elastic wave, $|k_5|$ is the wave vector of the second guided wave after it is diffracted by said third surface elastic wave, $|k_6|$ is the wave vector of the second guided wave diffracted by said fourth surface elastic wave, and $|K_3|$, $|K_4|$ are the wave vectors of said third and fourth surface elastic waves; and (ix) said first, second, third, and fourth surface elastic wave generating means being arranged such that said first and second guided waves emitted from said optical waveguide will scan a surface along respective aligned lines, which lines have ends which are adjacent to each other.

6. A light beam deflector as claimed in claim 5, wherein said optical waveguide is made of a Ti-diffused film formed on a surface of a wafer made of one of LiNbO$_3$, Si, and a crystalline substrate of sapphire.

7. A light beam deflector as claimed in claim 5, wherein said first, second, third and fourth surface elastic wave generating means comprise tilted-finger chirped interdigital transducers.

8. A light beam deflector as claimed in claim 5, wherein said first, second, third and fourth surface elastic wave generating means comprise curved-finger interdigital transducer.

9. A light beam deflector according to claim 5, further including a modulating circuit connected to said electrooptic light switch for controlling the voltage applied to said electrooptic light switch on the basis of an image signal, whereby said electrooptic light switch can double as a light modulator.

10. A light beam deflector as claimed in claim 9, wherein said first, second, third and fourth surface elastic wave generating means comprise tilted-finger chirped interdigital transducers.

11. A light beam deflector as claimed in claim 9, wherein said first, second, third and fourth surface elastic wave generating means comprise curved-finger interdigital transducers.

12. A light beam deflector comprising:
(i) an optical waveguide made of a material capable of propagating surface elastic waves therethrough and exhibiting electrooptic effects;
(ii) an electrooptic light switch which diffracts a single light beam, which is introduced into the optical waveguide and guided therethrough, and divides it into first and second guided waves, said electrooptic light switch varying an electric field applied to said optical waveguide, which in turn varies the efficiency with which the light beam is diffracted, thereby varying the ratio between the intensities of said first and second guided waves;
(iii) first surface elastic wave generating means for generating in said optical waveguide a first surface elastic wave which travels across the path of the first guided wave travelling in said optical waveguide and thereby diffracts and deflects the first guided wave;
(iv) second surface elastic wave generating means for generating in said optical waveguide a second surface elastic wave which travels across the path of the first guided wave which is diffracted by said first surface elastic wave and thereby diffracts and deflects said second guided wave in a direction which amplifies the deflection of the guided wave due to the diffraction thereof;
(v) third surface elastic wave generating means for generating in said optical waveguide a third surface elastic wave which travels across the path of the second guided wave travelling in said optical waveguide and thereby diffracts and deflects said second guided wave;
(vi) fourth surface elastic wave generating means for generating in said optical waveguide a fourth surface elastic wave which travels across the path of the second guided wave which is diffracted by said third surface elastic wave and thereby diffracts and deflects said second guided wave in a direction which amplifies the deflection of the second guided wave due to the diffraction thereof;
(vii) said first and second surface elastic wave generating means being arranged such that the frequencies and directions of said first and second surface elastic waves may be continuously varied while the following conditions are met:

$$|k_1|+|K_1|=|k_2|$$

$$|k_2|+|K_2|=|k_3|$$

where $|k_1|$ is the wave vector of the first guided wave before it is diffracted by said first surface elastic wave, $|k_2|$ is the wave vector of the first guided wave after it is diffracted by said first surface elastic wave, $|k_3|$ is the wave vector of the first guided wave diffracted by said second surface elastic wave, and $|K_1|$, $|K_2|$ are the wave vectors of said first and second surface elastic waves;

(viii) said third and fourth surface elastic wave generating means being arranged such that the frequencies and directions of said third and fourth surface elastic waves may be continuously varied while the following conditions are met:

$$|k_4 + K_3| = |k_5|$$

$$|k_5 + K_4| = |k_6|$$

where $k_4$ is the wave vector of the second guided wave before it is diffracted by said third surface elastic wave, $k_5$ is the wave vector of the second guided wave after it is diffracted by said third surface elastic wave, $k_6$ is the wave vector of the second guided wave diffracted by said fourth surface elastic wave, and $|K_3|$, $|K_4|$ are the wave vectors of said third and fourth surface elastic waves; and (ix) said first, second, third, and fourth surface elastic wave generating means being arranged such that said first and second guided waves emitted from said optical waveguide will scan a surface without overlapping each other.

13. A light beam deflector according to claim 12, further including a modulating circuit connected to said electrooptic light switch for controlling the voltage applied to said electrooptic light switch on the basis of an image signal, whereby said electrooptic light switch can double as a light modulator.

14. A light beam deflector as claimed in claim 12, wherein said first, second, third and fourth surface elastic wave generating means comprise tilted-finger chirped interdigital transducers.

15. A light beam deflector as claimed in claim 12, wherein said first, second, third and fourth surface elastic wave generating means comprise curved-finger interdigital transducers.

16. A light beam deflector as claimed in claim 13, wherein said first, second, third and fourth surface elastic wave generating means comprise tilted-finger chirped interdigital transducers.

17. A light beam deflector as claimed in claim 13, wherein said first, second, third and fourth surface elastic wave generating means comprise curved-finger interdigital transducers.

* * * * *